US008738764B1

(12) United States Patent
Schepis et al.

(10) Patent No.: US 8,738,764 B1
(45) Date of Patent: May 27, 2014

(54) METHODS AND SYSTEMS FOR CONTROLLING COMMUNICATIONS

(75) Inventors: Adam Schepis, Milford, MA (US); Keith Newstadt, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 602 days.

(21) Appl. No.: 12/411,963

(22) Filed: Mar. 26, 2009

(51) Int. Cl.
*G06F 15/173* (2006.01)

(52) U.S. Cl.
USPC .......................................................... 709/224

(58) Field of Classification Search
USPC .......................................................... 709/224
See application file for complete search history.

(56) References Cited

U.S. PATENT DOCUMENTS

| | | | |
|---|---|---|---|
| 7,117,495 B2 | 10/2006 | Blaser et al. | |
| 7,162,724 B2 | 1/2007 | Blaser et al. | |
| 7,165,260 B2 | 1/2007 | Blaser et al. | |
| 7,461,086 B1 | 12/2008 | Hurren et al. | |
| 7,461,096 B1 | 12/2008 | Hurren et al. | |
| 7,496,931 B2 | 2/2009 | Cook et al. | |
| 7,512,977 B2 | 3/2009 | Cook et al. | |
| 7,519,963 B1 | 4/2009 | Blaser et al. | |
| 7,542,988 B1 | 6/2009 | Cook et al. | |
| 7,549,164 B2 | 6/2009 | Cook et al. | |
| 7,620,956 B2 | 11/2009 | Cook et al. | |
| 7,877,413 B1 | 1/2011 | Cook et al. | |
| 7,886,291 B1 | 2/2011 | Jones et al. | |
| 7,945,897 B1 | 5/2011 | Cook | |
| 7,970,789 B1 | 6/2011 | Blaser et al. | |
| 8,010,961 B1 | 8/2011 | Cook et al. | |
| 8,060,940 B2 | 11/2011 | McCorkendale et al. | |
| 8,108,346 B1 | 1/2012 | Hurren et al. | |
| 8,112,392 B1 | 2/2012 | Bunnell et al. | |
| 8,112,767 B1 | 2/2012 | Cook | |
| 2007/0047533 A1* | 3/2007 | Criddle et al. | 370/356 |
| 2007/0180450 A1 | 8/2007 | Croft et al. | |
| 2008/0162692 A1* | 7/2008 | Schultz et al. | 709/224 |
| 2009/0132655 A1* | 5/2009 | Behrens | 709/204 |
| 2009/0228559 A1* | 9/2009 | Campbell et al. | 709/206 |
| 2011/0061045 A1 | 3/2011 | Phillips | |

OTHER PUBLICATIONS

Xenocode, Easy-to-use, high performance application virtualization, http://web.archive.org, as accessed Feb. 24, 2009.
VMWARE, VMware ThinApp User's Manual, VMware ThinApp 4.0.2, http://www.vmware.com/pdf/thinapp402_manual.pdf, as accessed Feb. 24, 2009.
Jonathan Clark, Thinstall and Wine, Thinstall Tech Blog, http://thinstall.blogspot.com/, as accessed Feb. 24, 2009.
Jared Blaser; Process Tracking Application Layered System; U.S. Appl. No. 11/324,571, filed Jan. 3, 2006.

(Continued)

*Primary Examiner* — Maceeh Anwari
(74) *Attorney, Agent, or Firm* — ALG Intellectual Property, LLC

(57) ABSTRACT

A computer-implemented method may associate a communication-control policy with a contact. The computer-implemented method may identify a first communication made via a first communication mechanism. The computer-implemented method may also identify a first alias associated with the first communication. The computer-implemented method may determine that the first alias is an alias of the contact. The computer-implemented method may apply the communication-control policy to the first communication, wherein the associating, the identifying the first communication, the identifying the first alias, the determining, and the applying may be performed by a communication-control computing system. Various other methods, systems, and computer-readable media are also disclosed.

20 Claims, 10 Drawing Sheets

(56) References Cited

OTHER PUBLICATIONS

Randall Cook; Dynamic Insertion and Removal of Virtual Software Sub-Layers; U.S. Appl. No. 12/058,782, filed Mar. 31, 2008.

Karl Bunnell et al.; Methods and Systems for Merging Virtualization Sublayers; U.S. Appl. No. 12/396,969, filed Mar. 3, 2009.

Lance TeNgaio; Distributed Application Virtualization; U.S. Appl. No. 12/142,549, filed Jun. 19, 2008.

Jeremy Hurren; Feature Based Software Virtualization; U.S. Appl. No. 11/960,706, filed Dec. 20, 2007.

Karl Bunnell et al.; Methods and Systems for Creating and Applying Patches for Virtualized Applications; U.S. Appl. No. 12/369,512, filed Feb. 11, 2009.

Randall Cook; Automatic Virtualization Based on User-Defined Criteria; U.S. Appl. No. 12/024,079, filed Jan. 31, 2008.

* cited by examiner

Contact Data 600

| Name | John R. Smith |
|---|---|
| Home Phone | |
| Work Phone | 1-811-413-4679 |
| Cell Phone | 1-912-376-9861 |
| Home Address | |
| Work Address | 56789 Park Ave, NY |
| Email Address | jsmith@gmail.com |
| IM Address | |
| Website | |
| Online Alias | John R. Smith |

Contact Data 610

| Name | |
|---|---|
| Home Phone | 1-123-456-1291 |
| Work Phone | |
| Cell Phone | 1-912-376-9861 |
| Home Address | 1234 Anywhere St, NV |
| Work Address | |
| Email Address | |
| IM Address | johnny boy |
| Website | www.smitty.com |
| Online Alias | smitty |

Contact Record 620

| Name | John R. Smith |
|---|---|
| Home Phone | 1-123-456-1291 |
| Work Phone | 1-811-413-4679 |
| Cell Phone | 1-912-376-9861 |
| Home Address | 1234 Anywhere St, NV |
| Work Address | 56789 Park Ave, NY |
| Website | www.smitty.com |
| Online Alias | AIM: johnny boy<br>GMAIL: jsmith<br>MYSPACE: smitty<br>LINKEDIN: John R. Smith |

*FIG. 6*

METHODS AND SYSTEMS FOR CONTROLLING COMMUNICATIONS

BACKGROUND

Traditional parental-control software may allow parents to block a child's ability to communicate using a specific communication system. For example, a parent may implement a control policy in an instant-messaging client. The control policy may block a young child from instant messaging a contact with whom the parent does not want the child to communicate. Unfortunately, communication control that is specific to a particular communication client may be ineffective given the Internet's current social landscape.

Communication mechanisms, such as e-mail, instant-messaging services, and social-networking websites, provide users with a variety of options for communicating with others. Therefore, even if a parent blocks a child from communicating with a contact over an instant-messaging system, the child and the contact may still be able to communicate using email, a social-networking website, and/or any other communication medium. What is needed, therefore, is a more effective mechanism for controlling communications.

SUMMARY

The present disclosure presents various methods and systems for controlling communications. Embodiments of this disclosure may apply communication-control policies to multiple communication mechanisms. For example, an administrator (e.g., a parent, an employer, a teacher, etc.) may associate a communication-control policy with a contact. The communication-control policy may indicate that a user (e.g., a child, an employee, a student, etc.) is allowed to communicate with the contact, is not allowed to communicate with the contact, or may define any other control over the user's communications with the contact. A monitoring module may identify a first communication made via a first communication mechanism and may identify a first alias associated with the first communication. A correlation module may determine that the first alias is an alias of the contact, and may store the relationship as correlation information. The monitoring module may obtain the correlation information and identify a communication-control policy associated with the contact. The monitoring module may then apply the communication-control policy to the first communication.

Since the communication-control policy is associated with the contact, and not a specific alias of the contact, the communication-control policy may be applied to communications to and from the contact regardless of the communication mechanism used. For example, the monitoring module may identify a second communication that a user attempts to make using a second communication mechanism. The correlation module may identify a second alias associated with the second communication and may determine that the second alias is an alias of the contact. The monitoring module may apply the communication-control policy to the second communication.

In some embodiments, the correlation module may correlate the first alias with the second alias. For example, the correlation module may identify contact data associated with the first alias, identify contact data associated with the second alias, and identify, by comparing the contact data associated with the first alias with the contact data associated with the second alias, at least one common characteristic between the first alias and the second alias. Then, the correlation module may associate both the first alias and the second alias with the contact.

In some embodiments, a graphical user interface may receive requests to associate the communication-control policy with the contact. The graphical user interface may also display reports that show communications made over the first and/or second communication mechanisms. The instant disclosure also includes various other embodiments, alternatives, and examples for controlling communications.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is a block diagram of an exemplary contact record according to at least one embodiment.

Figure 1:
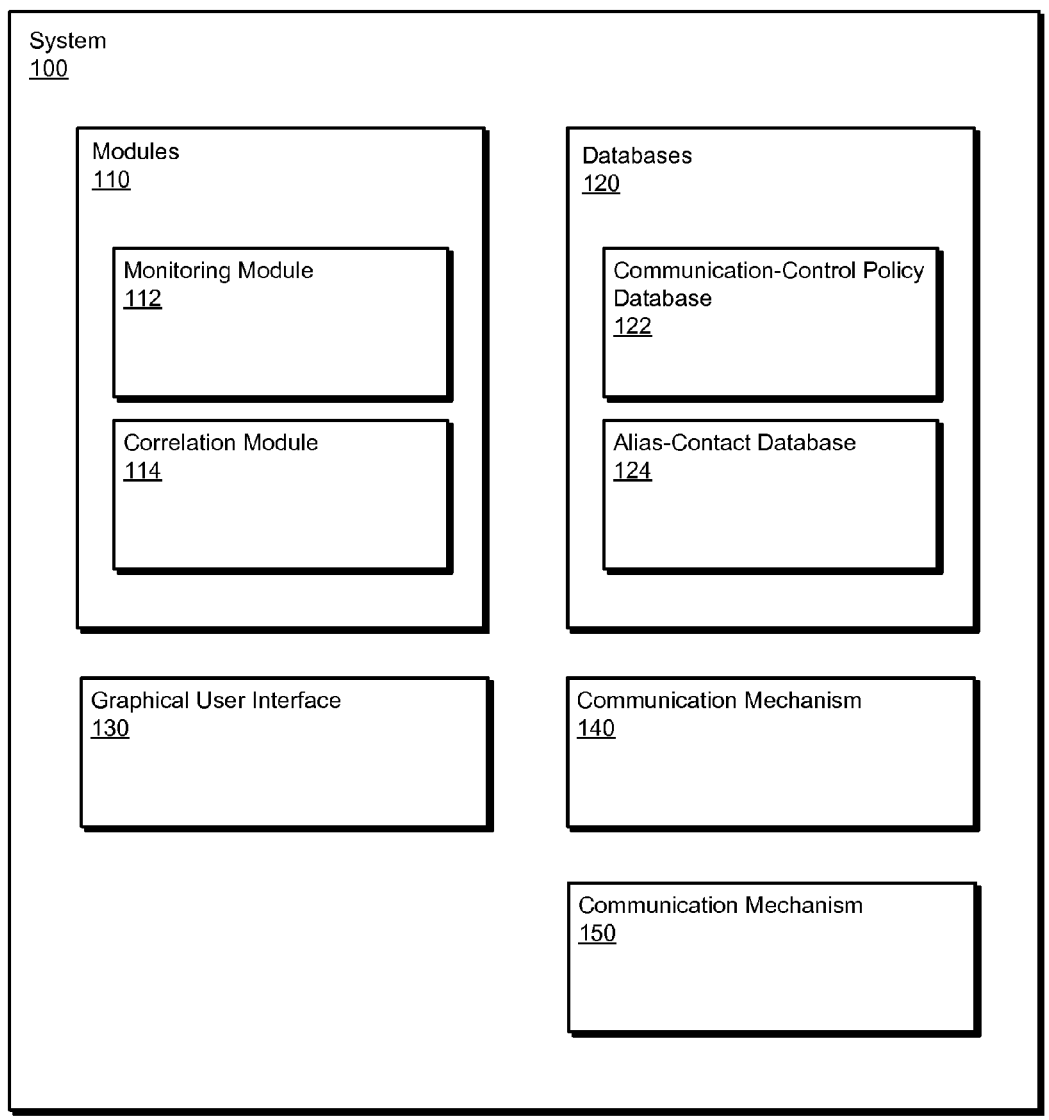
FIG. 1 is a block diagram of an exemplary system for controlling communications according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
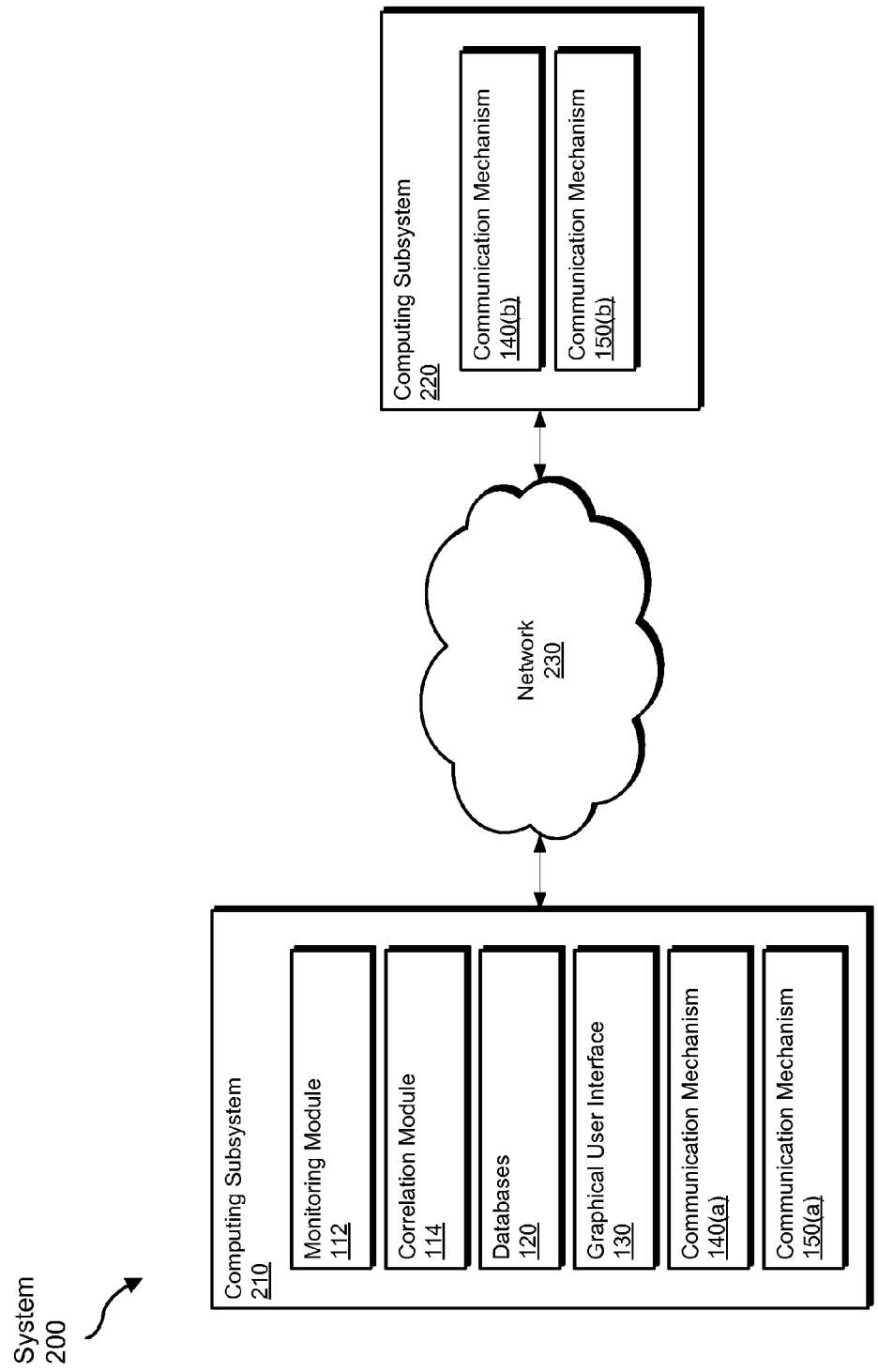
FIG. 2 is a block diagram of another exemplary system for controlling communications according to certain embodiments.
Figure 3:
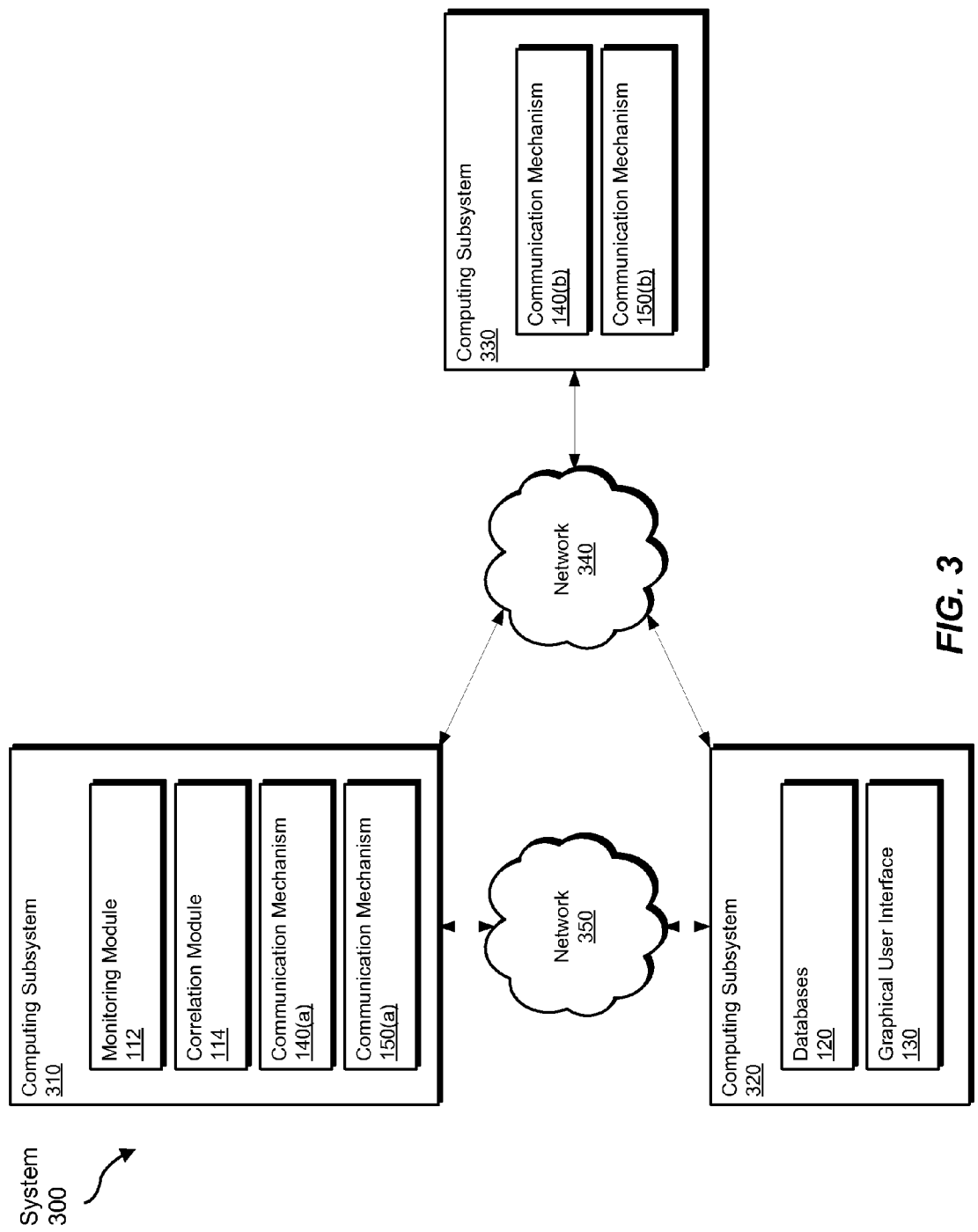
FIG. 3 is a block diagram of another exemplary system for controlling communications according to certain embodiments.
Figure 4:
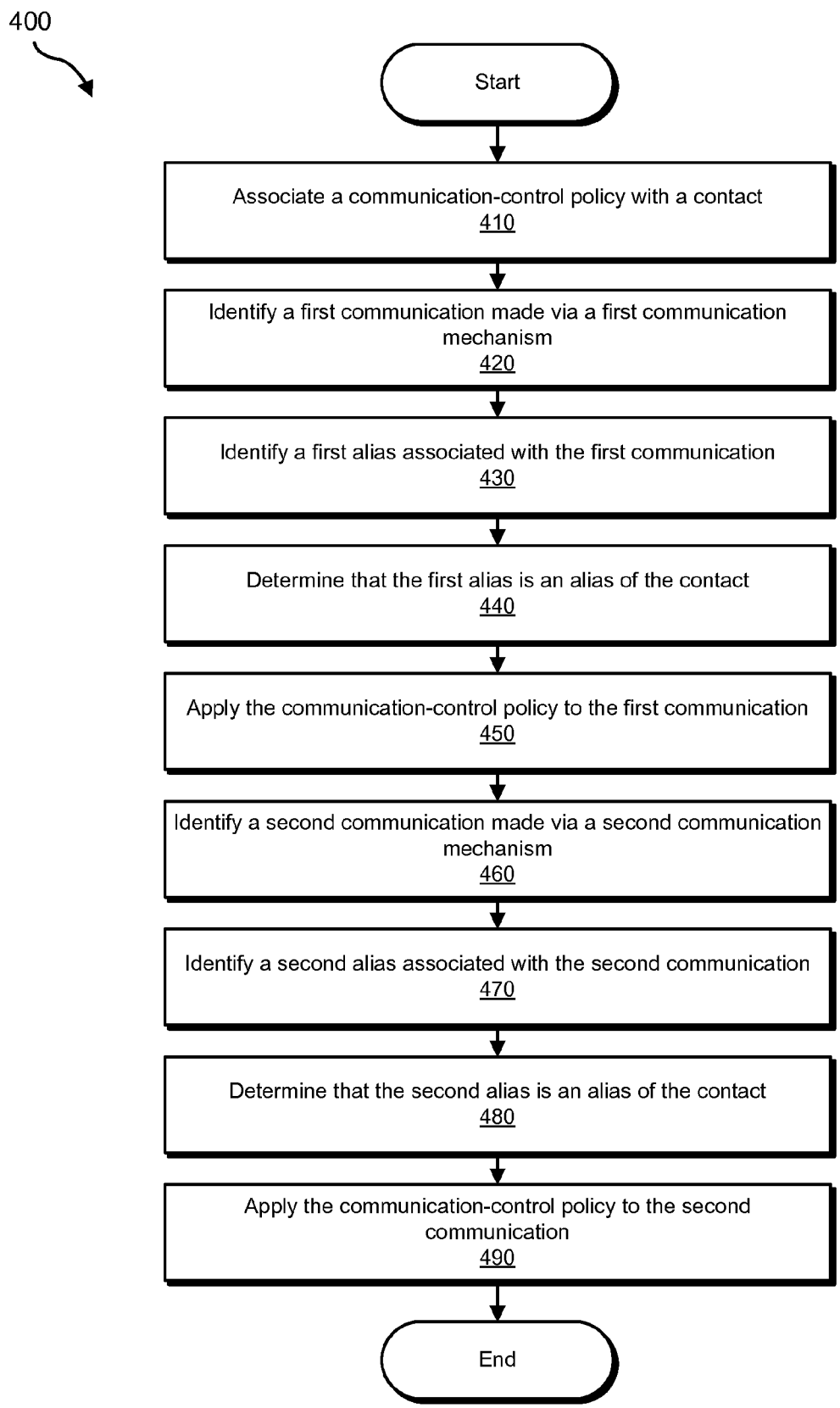
FIG. 4 is a flow diagram of an exemplary method for controlling communications.
Figure 7:
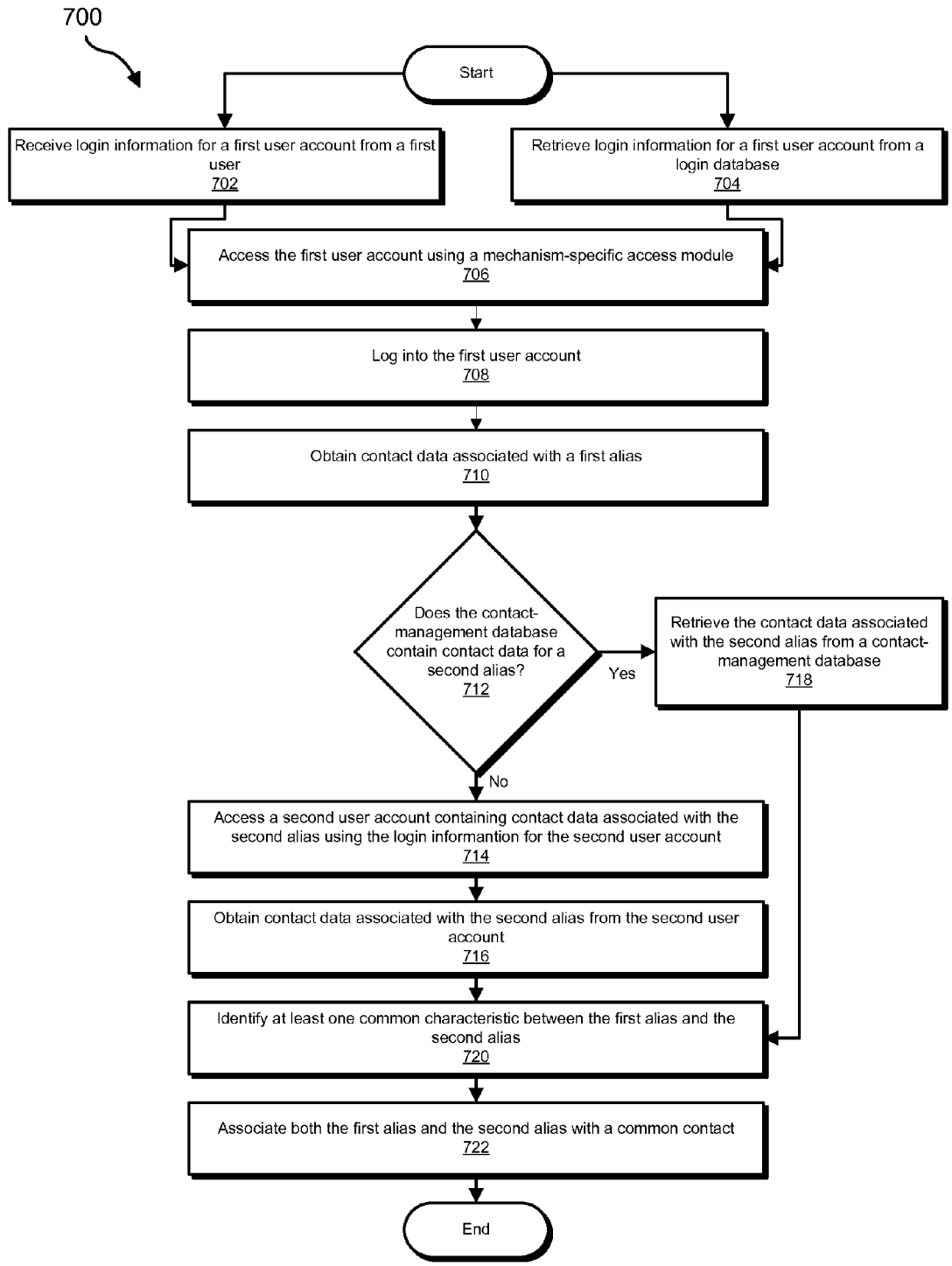
FIG. 7 is a flow diagram of an exemplary computer-implemented method for correlating aliases with real-world identities according to an additional embodiment.
Figure 8:
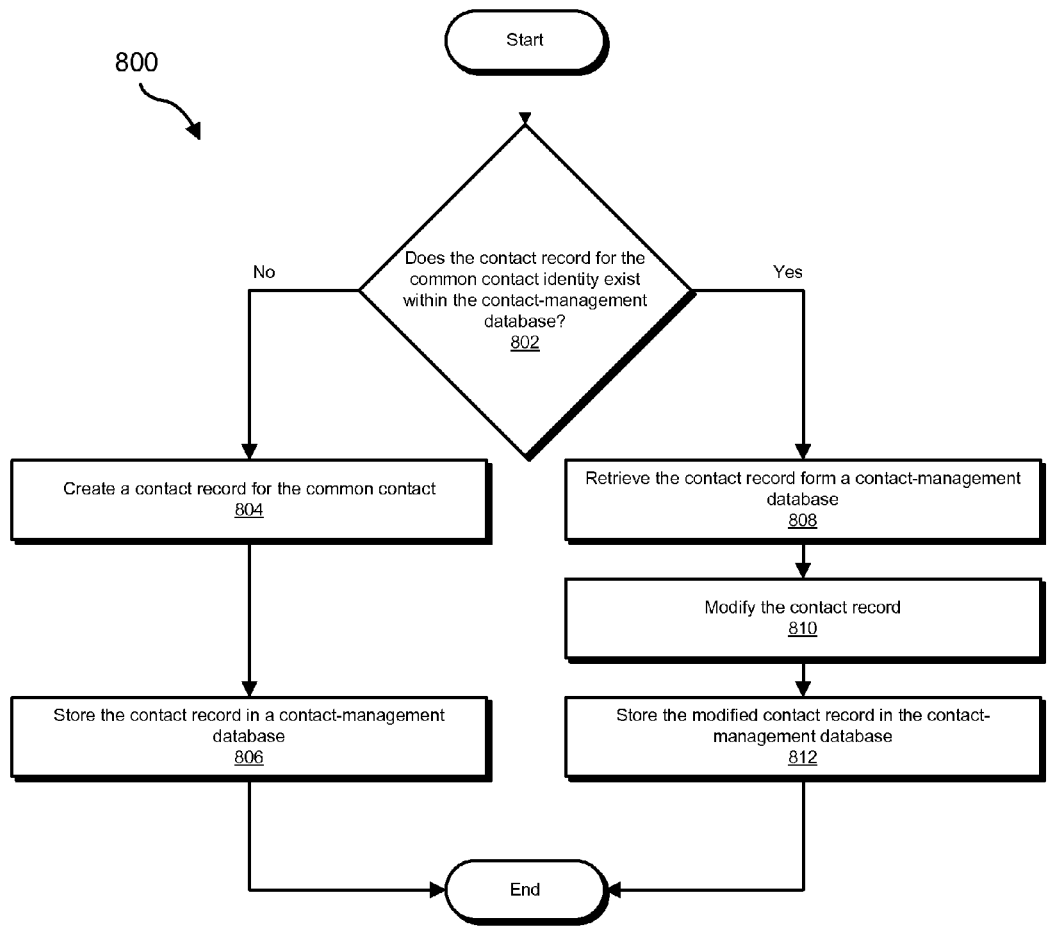
FIG. 8 is a flow diagram of an exemplary computer-implemented method for associating aliases with common contacts or identities according to certain embodiments.
Figure 9:
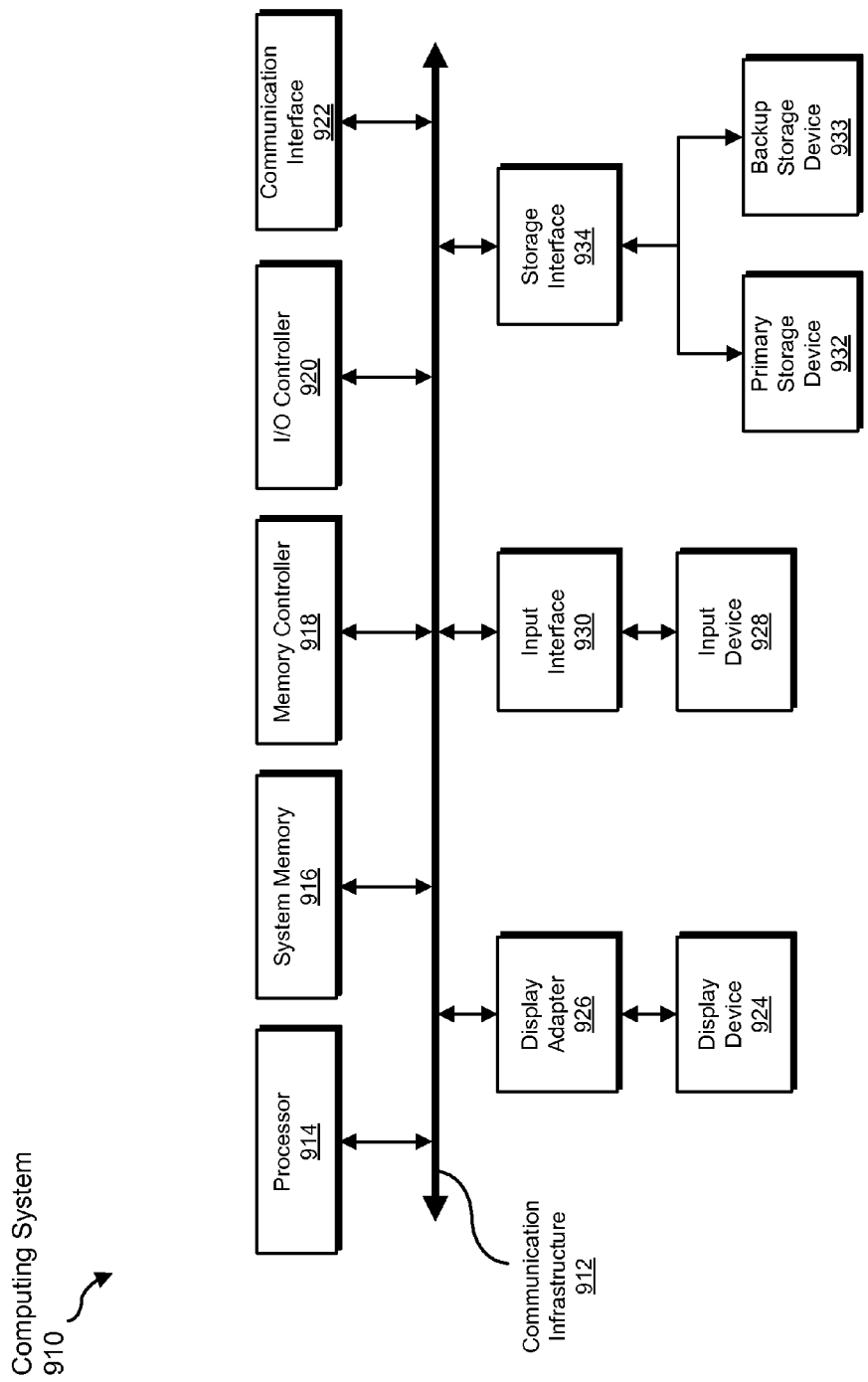
FIG. 9 is a block diagram of an exemplary computing system capable of implementing one or more of the embodiments described and/or illustrated herein.
Figure 10:
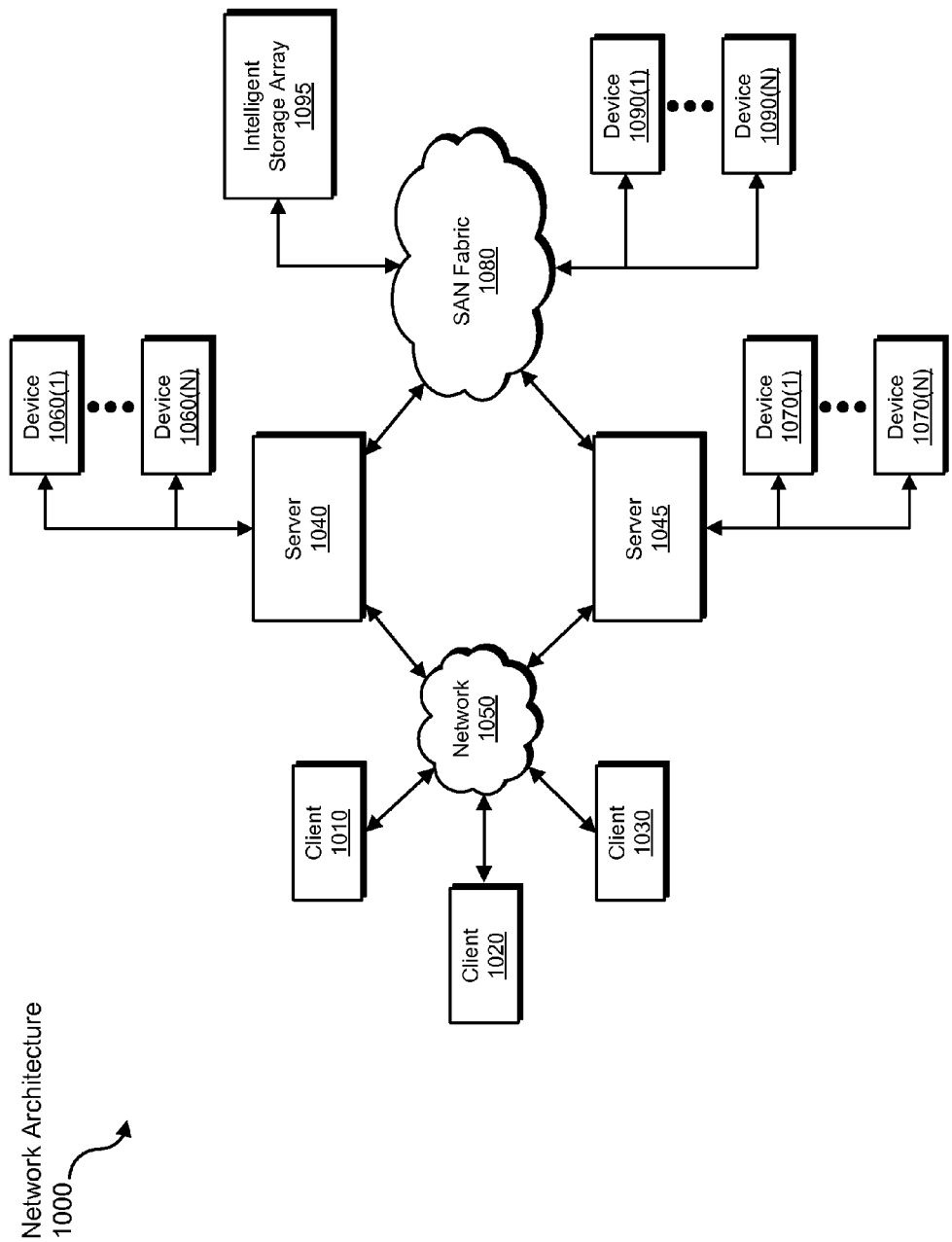
FIG. 10 is a block diagram of an exemplary computing network capable of implementing one or more of the embodiments described and/or illustrated herein.

Embodiments of the present disclosure provide various methods and systems for controlling communications. For example, embodiments of the instant disclosure may provide administrators with tools for blocking a users' communications with an individual regardless of the communication medium used. Medium-agnostic communication control may be implemented by associating a communication-control policy with a contact and applying the communication-control policy to communications to and from the contact. FIGS. 1-3 show exemplary systems for controlling communications, and FIG. 4 shows an exemplary method for accomplishing the same. FIGS. 5-8 provide examples of correlating aliases of a contact, and FIGS. 9 and 10 illustrate an exemplary computing system and network architecture for implementing embodiments of the instant disclosure.

FIG. 1 illustrates a communication-control system 100 for controlling communications between individuals. System 100 may include modules 110, databases 120, a graphical user interface 130, a first communication mechanism 140, and a second communication mechanism 150. Modules 110 may include a monitoring module 112 and a correlation module 114. Monitoring module 112 may be programmed to monitor and identify communications, identify aliases associated with communications, and/or apply communication-control policies to communications. Correlation module 114 may be programmed to determine that an alias is associated with a particular contact. For example, correlation module 114 may correlate multiple aliases with a single contact.

In certain embodiments, one or more of modules 110 in FIG. 1 may represent one or more software applications or programs that, when executed by a computing system, may cause the computing system to perform one or more steps disclosed herein. For example, as will be described in greater detail below, one or more of modules 110 may represent software modules configured to run on one or more computing devices, such as computing system 910 in FIG. 9 and/or portions of exemplary network architecture 1000 in FIG. 10. One or more of modules 110 in FIG. 1 may also represent all or portions of one or more special-purpose computers configured to perform one or more of the tasks associated with steps disclosed herein.

As previously noted, system 100 may include databases 120. Databases 120 may include a communication-control policy database 122 and an alias-contact database 124. Communication-control policy database 122 may associated one or more communication-control policies with one or more contacts. Alias-contact database 124 may associate one or more aliases with one or more contacts.

One or more databases 120 in FIG. 1 may represent a portion of one or more computing devices. For example, one or more databases 120 may represent a portion of one or more of the subsystems illustrated in FIGS. 2 and 3, computing system 910 in FIG. 9, and/or portions of exemplary network architecture 1000 in FIG. 10. Alternatively, one or more databases 120 in FIG. 1 may represent one or more physically separate devices capable of being accessed by a computing device, such as one or more of the subsystems illustrated in FIGS. 2-4, computing system 910 in FIG. 9, and/or portions of exemplary network architecture 1000 in FIG. 10.

System 100 may also include a first and second communication mechanism 140 and 150. As used herein the phrase "communication mechanism" may refer to any protocol, medium, channel, or service that may allow one person to communicate with another. For example, a communication mechanism may include an e-mail service, an instant-messaging service, a voice chat service, a social-networking website, and/or any other service for providing communications. Communication mechanisms may also include any communication protocol, such as a Simple Mail Transfer Protocol ("SMTP"), a voice messaging protocol such as a Voice Over Internet Protocol ("VoIP"), a text-messaging protocol such as a Short Message Service ("SMS") protocol, a HyperText Transfer Protocol ("HTTP"), or any other suitable protocol.

Examples of communication mechanisms include, without limitation, e-mail services (such as YAHOO! and GMAIL), instant-messaging services, text-messaging services, social- and professional-networking websites (such as LINKEDIN, FACEBOOK, and MYSPACE), contact-management services (such as PLAXO), newsgroups, message boards, peer-to-peer communities, or any other virtual community.

FIG. 2 illustrates a system 200 that provides an exemplary configuration of components of system 100. For example, system 200 may include a computing subsystem 210, a computing subsystem 220, and a network 230. Computing subsystem 210 may include a monitoring module 112, a correlation module 114, databases 120, a graphical user interface 130, a first communication mechanism 140($a$), and a second communication mechanism 150($a$). Computing subsystem 220 may include a first communication mechanism 140($b$) and a second communication mechanism 150($b$).

Computing subsystem 210 and/or 220 generally represent any type or form of computing device capable of reading computer-executable instructions. Examples of computing subsystem 210 and/or 220 include, without limitation, laptops, desktops, servers, cellular phones, personal digital assistants (PDAs), multimedia players, embedded systems, combinations of one or more of the same, exemplary computing system 910 in FIG. 7, or any other suitable computing device.

Computing subsystem 210 and computing subsystem 220 may communicate over network 230. Network 230 generally represents any medium or architecture capable of facilitating communications or data transfer. Network 230 may include, without limitation, the Internet, a Wide Area Network ("WAN"), a Local Area Network ("LAN"), a Personal Area Network ("PAN"), the Internet, Power Line communications ("PLC"), a cellular network (e.g., a GSM network), or the like. Network 230 may facilitate communication or data transfer using wireless and/or wired communications.

A user whose communications are being monitored, such as a child, an employee, or any other user, may use computing subsystem 210. The user may attempt to communicate with a contact using computing subsystem 220. As will be discussed in greater detail in FIG. 4, when the user attempts to communicate with the contact, monitoring module 112 may monitor and control these communications, regardless of the communication mechanism used.

System 200 shows graphical user interface 130 on the same computing subsystem that may be used by a user whose communications are being monitored. An administrator, such as a parent or an IT administrator, may use graphical user interface 130 to establish and maintain communication-control policies. Thus, in some embodiments, graphical user interface 130 and/or one or more of databases 120 may be located on a separate computing subsystem from the user.

FIG. 3 illustrates an exemplary communication-control system 300 where communication-control policies may be created and maintained on a computing device remote from the computing device that is being monitored. System 300 may include a computing subsystem 310, a computing subsystem 320, a computing subsystem 330, a network 340, and a network 350. Computing subsystem 310 may include monitoring module 112, correlation module 114, communication mechanism 140($a$), and communication mechanism 150($a$). Computing subsystem 320 may include databases 120 and graphical user interface 130, and computing subsystem 330 may include communication mechanism 140(b) and communication mechanism 150(b).

Computing subsystems 310, 320, and/or 330 generally represent any type or form of computing device capable of reading computer-executable instructions. Examples of computing subsystems 310, 320, and/or 330 may include, without limitation, laptops, desktops, servers, cellular phones, personal digital assistants (PDAs), multimedia players, embedded systems, combinations of one or more of the same, exemplary computing system 910 in FIG. 9, or any other suitable computing device.

In some embodiments, computing subsystem 310 may be a user's computing device, and computing subsystem 320 may be an administrator's computing device. The administrator may use computing subsystem 320 to establish and maintain communication-control policies. Thus, in some embodiments, network 350 may include a local area network, such as an enterprise network or a home network. In some embodiments, network 340 may include the Internet, and a user of computing subsystem 310 may attempt to communicate with a contact that is using computing subsystem 330. The discussion corresponding to FIG. 4 provides explanations and examples of how such communications may be monitored and controlled.

FIG. 4 shows an exemplary method for controlling communications. The steps shown in FIG. 4 may be performed by any suitable computer-executable code and/or computing system. In some embodiments, the steps shown in FIG. 4 may be performed by one or more of monitoring module 112, correlation module 114, and/or graphical user interface 130. For example, at step 410 an administrator may use graphical user interface 130 to associate a communication-control policy with a contact, and the association of the policy and the contact may be stored in communication-control policy database 122.

A communication-control policy may include any policy for controlling communications. For example, a communication-control policy may include a policy indicating that communications should be allowed, blocked, partially blocked, and/or controlled in any other way. A communication-control policy may additionally or alternatively indicate that a warning or other notification should be displayed to a user when the user attempts to communicate with a particular contact. A communication-control policy may indicate that particular communications, communication sessions, and/or other communication data should be controlled.

By associating a communication-control policy with a contact, communications with a contact may be controlled regardless of the communication mechanism used to communicate with the contact. As used herein, the term "contact" generally refers to a friend, an acquaintance, a stranger, or any other individual with whom a user may attempt to communicate.

At step 420, monitoring module 112 may identify a first communication made via communication mechanism 140. The first communication may either be a communication sent from communication mechanism 140(a) to communication mechanism 140(b) (i.e., a communication sent from a monitored user to a contact) or a communication sent from communication mechanism 140(b) to communication mechanism 140(a) (i.e., a communication sent from a contact to a monitored user).

Monitoring module 112 may monitor communications made through one or more communication mechanisms. Monitoring module 112 may include a pluggable engine that utilizes a network driver and/or any number of monitoring plug-ins to monitor communications. The network driver may monitor incoming and outgoing communications and may transfer one or more communications to one or more monitoring plug-ins. In some embodiments, monitoring module 112 may include a monitoring plug-in for each communication mechanism to be monitored. For example, monitoring module 112 may include a plug-in associated with communication mechanism 140(a) and a plug-in associated with communication mechanism 150(a).

A monitoring plug-in may be programmed to interpret specific types of communications. A monitoring plug-in may also be programmed to determine whether a communication should be blocked, allowed, or otherwise controlled. In some embodiments, a monitoring plug-in may also be responsible for performing packet altering when a conversation is blocked. According to various embodiments, a new monitoring plug-in may be installed to monitoring module 112 to monitor a new communication mechanism. A monitoring plug-in may also be removed from monitoring module 112 when a communication mechanism associated with the plug-in is no longer being used. A security software vendor may package monitoring plug-ins with security software and/or may provide downloadable plug-ins.

As described above, monitoring module 112 may monitor and control network traffic with a network driver and one or more monitoring plug-ins. Monitoring module 112 may additionally or alternatively include any other suitable monitoring and/or control mechanism for monitoring and controlling network traffic.

At step 430, monitoring module 112 may identify a first alias associated with the first communication. The term "alias" may refer to usernames (used, for example, by social- and professional-networking sites, message boards, and the like), handles (used, for example, by instant-messaging services), local portions of e-mail addresses (i.e., the portion of the email address that precedes the domain-name portion of the email address), or any other suitable identification mechanism.

Monitoring module 112 may identify an alias associated with a communication by locating the alias within the communication. For example, monitoring module 112 may parse the communication to determine to whom the communication is being sent and/or from whom the communication is being received. In some embodiments, monitoring module 112 may identify an e-mail address, a handle, a username, and/or or any other alias information in the communication.

At step 440, correlation module 114 may determine that the alias is an alias of the contact. For example, monitoring module 112, after identifying the alias, may query correlation module 114 to determine whether a contact is associated with the alias. As described in greater detail in the discussion of FIGS. 5-8 below, an alias may be associated with a contact in any suitable manner.

At step 450, a communication-control policy associated with the contact may be applied to the first communication. For example, monitoring module 112 may apply the communication-control policy to the first communication. Monitoring module 112 may apply the communication-control policy to the communication by blocking the communication, allowing the communication, modifying the communication, displaying a notification to the user, and/or by performing any other communication control action.

If monitoring module 112 blocks or otherwise impedes a communication, the user may attempt to use a different communication mechanism to communicate with the contact. For example, if the user is blocked from using communication mechanism 140 for communicating with the contact, the user may attempt to use communication mechanism 150 to communicate with the contact.

At step 460, monitoring module 112 may identify a second communication made via a second communication mechanism. At step 470, monitoring module 112 may identify a second alias associated with the second communication. At step 480, monitoring module 112 may query correlation module 114 to determine that the second alias is an alias of the contact. After determining that the second alias is also an alias of the contact, at step 490 monitoring module 112 may apply the communication-control policy (i.e., the same communication-control policy that was applied to the first communication) to the second communication. Steps 460-490 are similar to steps 420-450, respectively. Therefore, the discussion of steps 420-450 may apply to steps 460-490.

As an example of how the method of FIG. 4 may be implemented, a parent may use graphical user interface 130 to establish a communication-control policy for a child's communications. The communication-control policy may prohibit the child from communicating with a friend the parent deems to be a bad influence of the child. The child may attempt to contact the friend using communication mechanism 140(a), which may include the MYSPACE website. Monitoring module 112 may detect the communication and may identify an alias (e.g., the friend's username) associated with a destination of the communication. Monitoring module 112 may query alias-contact database 124 with the alias, and alias-contact database 124 may provide a contact name (e.g., the name of the friend) associated with the alias.

Monitoring module 112 may then query communication-control policy database 122 with the contact name, and communication-control policy database 122 may respond with the policy indicating that communications with the contact (i.e., the child's friend) should be blocked. Monitoring module 112 may then block the communication. In some embodiments, monitoring module 112 may additionally or alternatively modify the communication to tell the child's friend that the communication session has been blocked.

After the communication through MYSPACE has been blocked, the child may attempt to contact the friend over communication mechanism 150, which may be the messaging system GOOGLE TALK. Monitoring module 112 may detect the communication and may identify an alias (e.g., the friend's handle) associated with a destination of the communication. Monitoring module 112 may query alias-contact database 124 with the alias, and alias-contact database 124 may provide a contact name (i.e., the name of the friend) associated with the alias. Monitoring module 112 may then query communication-control policy database 122 with the contact name, and communication-control policy database may respond with same policy previously provided for the friend. The communication over GOOGLE TALK may be blocked, just as the communication over MYSPACE was blocked. This process may be repeated for any communication mechanism the child attempts to use to contact the friend.

Communication-control policies may be established by parents, guardians, teachers, and/or others interested in protecting children from inappropriate communications. Thus, the term "parent" is used herein to refer to any individual who establishes, maintains, or otherwise administers control policies that apply to communications involving a child. As previously noted, in addition to applying to parental controls, embodiments of the instant disclosure may apply to administrator controls that may allow an administrator to control an employee's communications, a student's communications, and/or any other user's communications.

Correlation module 114 may create associations between aliases and contacts by correlating one or more aliases with a contact. Correlation module 114 may use any suitable method or algorithm to correlate aliases with contacts. Correlation module 114 may implement any method or process described in U.S. patent application Ser. No. 11/960,402, filed on 19 Dec. 2007 and titled "Systems and Methods for Correlating Online Aliases with Real-World Identities," the disclosure of which is incorporated, in its entirety, by this reference. As an example, correlation module 114 may identify contact data associated with a first alias, identify contact data associated with the second alias, and identify, by comparing the contact data associated with the first alias with the contact data associated with the second alias, at least one common characteristic between the first alias and the second alias. After determining this common characteristic, correlation module 114 may associate the first and second aliases with the contact. For example, correlation module 114 may associate the first and second aliases with the contact in alias-contact database 124. FIGS. 5-8 provide examples, explanations, and alternatives of correlating aliases with contacts.

Figure 5:
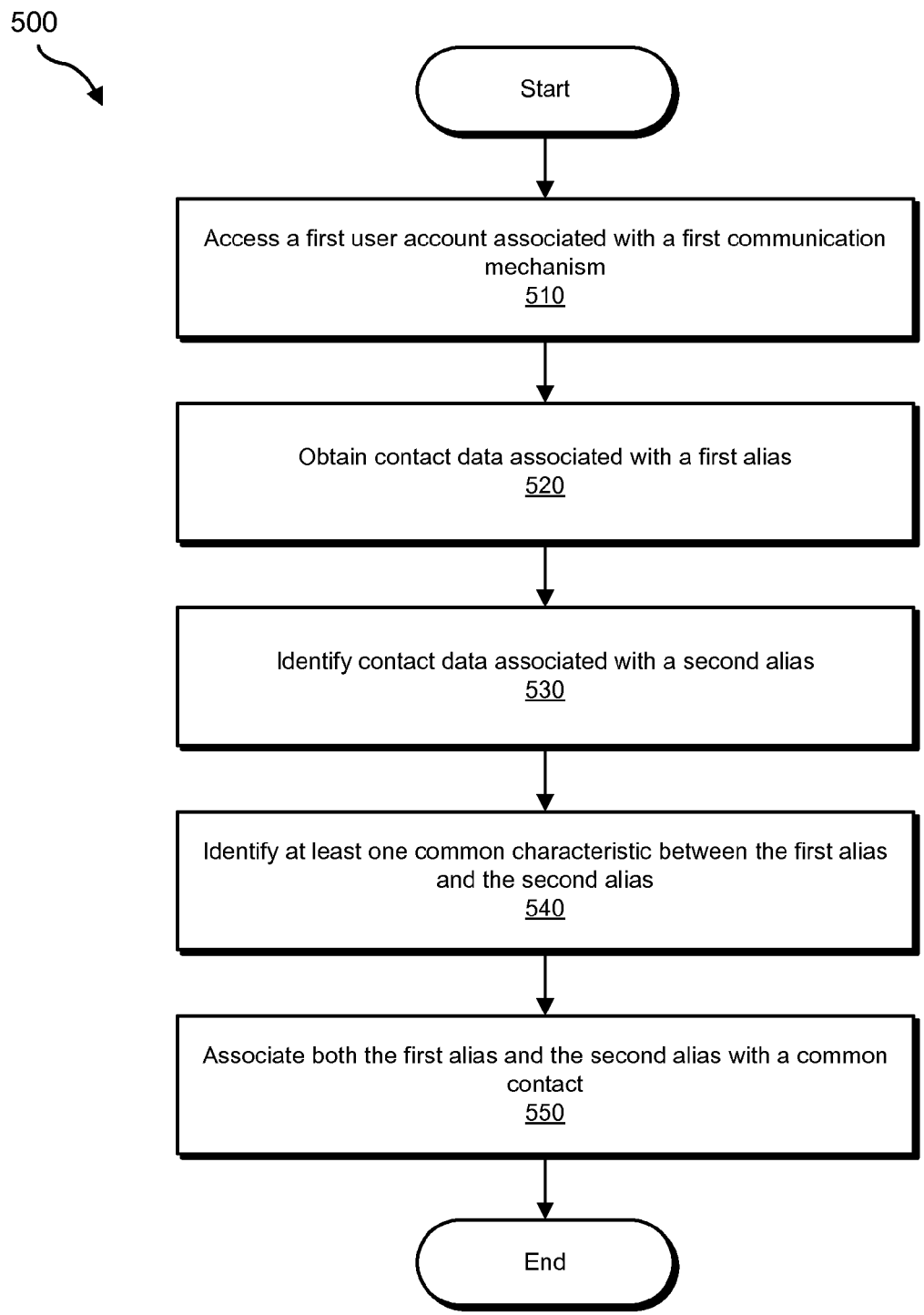
FIG. 5 is a flow diagram of an exemplary computer-implemented method for correlating aliases with real-world identities according to at least one embodiment.

FIG. 5 is a flow diagram of an exemplary computer-implemented method 500 for identifying and correlating aliases with real-world identities. As illustrated in this figure at step 510, a computing device (such as computing subsystem 210 in FIG. 2 and/or computing subsystem 310 in FIG. 3) may access a first user account associated with a first communication mechanism.

User accounts for a communication mechanism may be accessed in a variety of ways. For example, in certain embodiments a computing device may access a user account associated with a communication mechanism by locating and retrieving, using a login module, login information for the user account from a login-information database. The computing device may then use that login information to log into the user account. In an alternative embodiment, a computing device may access a user account associated with a communication mechanism by receiving login information for the user account from a user and then using that login information to log into the user account. In certain embodiments, an access module may be used to access user accounts. User accounts may also be accessed using mechanism-specific access modules.

At step 520, the computing device may obtain contact data associated with a first alias from the first user account. Any type or form of contact information or data associated with an alias may be obtained from the first user account; including, for example, both computer-readable and human-readable data. Examples of contact data associated with an alias include, without limitation, a name of a contact, an alias for a contact, an email address for a contact, a phone number for a contact, a fax number for a contact, a mailing address for a contact, a website address for a contact, an instant-messaging address for a contact, or any other potentially useful information.

Information or data may be obtained from user accounts in a variety of ways. In one embodiment, computer-readable data may be received from a communication mechanism in response to a request transmitted by a computing device. For example, an access module may cause a computing device to export computer-readable data, such as contact data, from a first user account associated with communication mechanism 140.

Data may also be obtained from communication mechanisms by "screen scraping" or extracting data from a display output of the communication mechanism. For example, an access module may cause a computing device to identify data displayed in human-readable form by communication mechanism 140, screen scrape or extract this human-readable data from communication mechanism 140, convert this human-readable data into computer-readable data, and then store this computer-readable data in alias-contact database 124.

At step 530, the computing device may identify contact data associated with a second alias. This contact data may be identified in a variety of ways. For example, in certain embodiments, and as will be described in greater detail below in connection with FIG. 7, identifying contact data associated with the second alias may comprise identifying login information for a second user account associated with a second communication mechanism, accessing the second user account using the login information, and then obtaining the contact data associated with the second alias from the second user account. In an alternative embodiment, identifying contact data associated with the second alias may comprise retrieving contact data associated with the second alias from a contact-management database (e.g., contacts stored in MICROSOFT OUTLOOK).

At step 540, the computing device may identify, by comparing the contact data associated with the first alias with the contact data associated with the second alias, at least one common characteristic between the first alias and the second alias. Common characteristics between aliases may be identified in a variety of ways. In at least one embodiment, identifying at least one common characteristic between aliases may comprise identifying at least one common name, alias, email address, phone number, fax number, mailing address, website address, instant-messaging address, or other potentially relevant characteristic.

For example, at step 540 correlation module 114 may cause a computing device to compare contact data associated with the first alias with contact data associated with the second alias to determine whether any portion of the contact data associated with the aliases is the same. For example, as will be described in greater detail below in connection with FIG. 6, the computing device may determine whether an email address associated with the first alias matches an email address associated with the second alias.

If the computing device identifies at least one common characteristic between the first alias and the second alias, then at step 550 the computing device may associate both the first alias and the second alias with a common contact or identity. Aliases may be associated with a common contact or identity in a variety of ways. For example, associating aliases with a common contact or identity may comprise creating or modifying a contact record for a contact that contains data identifying at least the first alias, the second alias, and contact information or data for the contact.

The phrase "contact record" may generally refer to a data record containing contact information for a friend, family member, or acquaintance of a user. Examples of the type of contact information that may be contained in a contact record include, without limitation, the name of a contact, an email address for a contact, a phone number for a contact, a fax number for a contact, a mailing address for a contact, a website address for a contact, or any other potentially useful information. In at least one embodiment, contact records may also contain information identifying the various aliases of a contact. In certain embodiments, contact records may be stored in a contact-management database. Associating aliases with a common contact or identity may also comprise displaying, using a graphical user interface, the various aliases of a contact.

For the sake of clarity, and by way of example, the following detailed description will provide an illustration of how exemplary method 500 may be implemented. In this example, communication mechanism 140 may represent a professional-networking website, such as LINKEDIN, and communication mechanism 150 may represent a social-networking website, such as MYSPACE.

A login module may cause a computing device to retrieve login information for a first user account associated with communication mechanism 140 (which, in this case, is a professional-networking website) from a login-information database. An access module may then cause the computing device to log into the first user account associated with communication mechanism 140 using the login information retrieved from the login-information database.

The computing device may identify and obtain contact data for at least one alias from the first user account. As illustrated in FIG. 6, contact data 600 may identify the name of a contact ("John R. Smith"), a work phone number for the contact ("1-811-413-4679"), a cell phone number for the contact ("1-912-376-9861"), a work address for the contact ("56789 Park Ave, NY"), an email address for the contact ("jsmith@gmail.com"), and a username or alias for the contact ("John R. Smith") used in connection with communication mechanism 140 (which, in this case, is a professional-networking website).

The computing device may identify contact data associated with a second alias by: retrieving login information for a second user account associated with communication mechanism 150 (which, in this case, may be a social-networking website) from the login-information database, logging into the second user account using the login information retrieved from the login-information database, and obtaining contact data from the second user account.

Contact data 610, in this example the contact data obtained from the second user account, may identify a home phone number for a contact ("1-123-456-1291"), a cell phone number for the contact ("1-912-376-9861"), a home address for the contact ("1234 Anywhere St, NV"), an IM address for the contact ("johnny boy"), a website for the contact ("www.s-mitty.com"), and a username or alias for the contact ("smitty") used in connection with communication mechanism 150 (which, in this case, is a social-networking website, such as MYSPACE).

Correlation module 114 may cause the computing device to identify, by comparing contact data 600 associated with the first alias with contact data 610 associated with the second alias, at least one common characteristic between the first alias and the second alias. In this example, the computing device may determine that a cell phone number associated with both the first alias and the second alias is identical.

Upon identifying at least one common characteristic, the computing device may associate both the first alias and the second alias with a common contact or identity, which, in this case, may be the contact John R. Smith. In this example, the computing device may associate both the first alias and the second alias with the contact John R. Smith by creating contact record 620 for Mr. Smith that contains information that identifies each of the known aliases used by Mr. Smith. For example, contact record 620 may identify the following known aliases for Mr. Smith: "johnny boy" for AIM, "jsmith" for GMAIL, "smitty" for MYSPACE, and "John R. Smith" for LINKEDIN.

In certain embodiments, contact record 620 may also contain contact information for Mr. Smith. In at least one embodiment, the contact information contained in contact record 620 for Mr. Smith may be obtained from contact data 600 and 610, which, as detailed above, may be obtained from user accounts associated with communication mechanisms 140 and 150.

As detailed above, communication mechanisms may be accessed using mechanism-specific access modules or plug-ins that may be tailored to access specific communication mechanisms or services. FIG. 7 is a flow diagram of an exemplary computer-implemented method 700 for correlating aliases with real-world identities in which communication mechanisms may be accessed using mechanism-specific access modules. As illustrated in this figure, at step 702 a computing device may receive login information for a first user account associated with a first communication mechanism from a user. Alternatively, at step 704 a computing device may retrieve login information for a first user account associated with the first communication mechanism from a login-information database.

At step 706, the computing device may access the first user account using a mechanism-specific access module. The phrase "mechanism-specific access module" may generally refer to modules or plug-ins that are specifically tailored to perform various mechanism-specific functions. For example, a mechanism-specific access module may be configured to access (e.g., login) or retrieve information from (e.g., screen scrape) specific communication mechanisms.

In certain embodiments, the various functionalities performed by mechanism-specific access modules may be mapped to a simple interface operated by an access module, whose functionalities may be called as needed by the access module to normalize the actions performed by the access module. For example, the access module may, when accessing a certain communication mechanism, such as a web-based email service, call a mechanism-specific access module specially configured to log into this specific web-based email service. Examples of mechanism-specific access modules may include, without limitation, plug-ins, specialized application programs, or the like.

At step 708, the computing device may, using the login information for the first user account, log into the first user account. At step 710, the computing device may obtain contact data associated with a first alias from the first user account. At step 712, the computing device may determine whether a contact-management database contains contact data associated with a second alias. For example, the computing device may search a contact-management database to determine whether it contains contact data for the second alias that was previously obtained from a user account associated with a communication mechanism. If the contact-management database contains contact data for the second alias, then control proceeds to step 718 where the computing device retrieves the contact data for the second alias from the contact-management database. Otherwise control proceeds to step 714, where the computing device accesses a second user account containing data associated with the second alias using the login information for the second user account. At step 716, the computing device then obtains contact data associated with the second alias from the second user account.

At step 720, the computing device identifies, by comparing the contact data associated with the first alias with the contact data associated with the second alias, at least one common characteristic between the first alias and the second alias. At step 722, the computing device associates both the first alias and the second alias with a common contact identity.

As detailed above, aliases may be associated with contacts in a variety of ways. FIG. 8 is a flow diagram of an exemplary computer-implemented method 800 for associating aliases with contacts according to at least one embodiment. As illustrated in this figure, at step 802, upon identifying at least one common characteristic between a first alias and a second alias, a computing device may determine whether a contact record for a common contact to be associated with the first and second aliases exists within a contact-management database. If a contact record for the common contact does not exist within the contact-management database, then at step 804 the computing device may create a contact record for the common contact that associates the first and second aliases with the common contact. At step 806, the computing device may store the contact record in a contact-management database.

Alternatively, if an existing contact record for the common contact to be associated with the aliases is located within the contact-management database, then control proceeds to step 808, where the computing device may retrieve the contact record for the common contact from a contact-management database. At step 810, the computing device may modify, based on the contact data associated with the first alias and the contact data associated with the second alias, the contact record for the common contact.

This contact record may be modified in a variety of ways. For example, the computing device may modify the contact record by adding one or more additional aliases for the common contact to the contact record. The computing device may also modify other contact information stored in the contact record, such as the name of the common contact, an email address stored in the contact record, a phone number stored in the contact record, a fax number stored in the contact record, a mailing address stored in the contact record, a website address stored in the contact record, an instant-messaging address stored in the contact record, or any other contact data stored in the contact record. At step 812, the computing device may store the modified contact record in the contact-management database.

FIG. 9 is a block diagram of an exemplary computing system 910 capable of implementing one or more of the embodiments described and/or illustrated herein. Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may comprise at least one processor 914 and a system memory 916.

Processor 914 generally represents any type or form of processing unit capable of processing data or interpreting and executing instructions. In certain embodiments, processor 914 may receive instructions from a software application or module. These instructions may cause processor 914 to perform the functions of one or more of the exemplary embodiments described and/or illustrated herein. For example, processor 914 may perform and/or be a means for performing, either alone or in combination with other elements, one or more of the associating, identifying, determining, applying, correlating, comparing, associating, monitoring, blocking, recording, causing, and/or receiving steps described herein. Processor 914 may also perform and/or be a means for performing any other steps, methods, or processes described and/or illustrated herein.

System memory 916 generally represents any type or form of volatile or non-volatile storage device or medium capable of storing data and/or other computer-readable instructions. Examples of system memory 916 include, without limitation, random access memory ("RAM"), read only memory ("ROM"), flash memory, or any other suitable memory device. Although not required, in certain embodiments computing system 910 may comprise both a volatile memory unit (such as, for example, system memory 916) and a non-volatile storage device (such as, for example, primary storage device 932, as described in detail below).

In certain embodiments, exemplary computing system 910 may also comprise one or more components or elements in addition to processor 914 and system memory 916. For example, as illustrated in FIG. 9, computing system 910 may comprise a memory controller 918, an Input/Output ("I/O") controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an ISA, PCI, PCIe, or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912. In certain embodiments, memory controller may perform and/or be a means for performing, either alone or in combination with other elements, one or more of the steps or features described and/or illustrated herein, such as associating, identifying, determining, applying, correlating, comparing, associating, monitoring, blocking, recording, causing, and/or receiving.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934. I/O controller 920 may be used, for example, to perform and/or be a means for performing, either alone or in combination with other elements, one or more of the associating, identifying, determining, applying, correlating, comparing, associating, monitoring, blocking, recording, causing, and/or receiving steps described herein. I/O controller 920 may also be used to perform and/or be a means for performing other steps and features set forth in the instant disclosure.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network comprising additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, SCSI host adapters, USB host adapters, IEEE 994 host adapters, SATA and eSATA host adapters, ATA and PATA host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution. In certain embodiments, communication interface 922 may perform and/or be a means for performing, either alone or in combination with other elements, one or more of the associating, identifying, determining, applying, correlating, comparing, associating, monitoring, blocking, recording, causing, and/or receiving steps disclosed herein. Communication interface 922 may also be used to perform and/or be a means for performing other steps and features set forth in the instant disclosure.

As illustrated in FIG. 9, computing system 910 may also comprise at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also comprise at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device. In at least one embodiment, input device 928 may perform and/or be a means for performing, either alone or in combination with other elements, one or more of the associating, identifying, determining, applying, correlating, comparing, associating, monitoring, blocking, recording, causing, and/or receiving steps disclosed herein. Input device 928 may also be used to perform and/or be a means for performing other steps and features set forth in the instant disclosure.

As illustrated in FIG. 9, exemplary computing system 910 may also comprise a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 910.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also comprise other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

In certain embodiments, storage devices 932 and 933 may be used, for example, to perform and/or be a means for performing, either alone or in combination with other elements, one or more of the associating, identifying, determining, applying, correlating, comparing, associating, monitoring, blocking, recording, causing, and/or receiving steps disclosed herein. Storage devices 932 and 933 may also be used to perform and/or be a means for performing other steps and features set forth in the instant disclosure.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an application specific integrated circuit ("ASIC") adapted to implement one or more of the exemplary embodiments disclosed herein.

FIG. 10 is a block diagram of an exemplary network architecture 1000 in which client systems 1010, 1020, and 1030 and servers 1040 and 1045 may be coupled to a network 1050. Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or run certain software applications. Network 1050 generally represents any telecommunication or computer network including, for example, an intranet, a wide area network ("WAN"), a local area network ("LAN"), a personal area network ("PAN"), or the Internet.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent network-attached storage ("NAS") devices configured to communicate with servers 1040 and 1045 using various protocols, such as NFS, SMB, or CIFS.

Servers 1040 and 1045 may also be connected to a storage area network ("SAN") fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050. Accordingly, network architecture 1000 may perform and/or be a means for performing, either alone or in combination with other elements, one or more of the associating, identifying, determining, applying, correlating, comparing, associating, monitoring, blocking, recording, causing, and/or receiving steps disclosed herein. Network architecture 1000 may also be used to perform and/or be a means for performing other steps and features set forth in the instant disclosure.

As detailed above, computing system 910 and/or one or more components of network architecture 1000 may perform and/or be a means for performing, either alone or in combination with other elements, one or more steps of the exemplary methods described and/or illustrated herein. For example, a computing system (e.g., computing system 910 and/or one or more of the components of network architecture 1000) may perform a computer-implemented method for controlling communications. For example, the computing system may associate a communication-control policy with a contact. The computing system may identify a first communication made via a first communication mechanism. The computing system may also identify a first alias associated with the first communication. The computing system may determine that the first alias is an alias of the contact. The computing system may also apply the communication-control policy to the first communication. The computing system may be a communication-control computing system.

In various embodiments, the computing system may identify a second communication made via a second communication mechanism. The computing system may also identify a second alias associated with the second communication. The computing system may determine that the second alias is an alias of the contact. The computing system may also apply the communication-control policy to the second communication. In some embodiments, the computing system may correlate the first alias with the second alias. In other embodiments, the computer system may correlate the first alias with the second alias by identifying contact data associated with the first alias; by identifying contact data associated with the second alias; and by identifying, by comparing the contact data associated with the first alias with the contact data associated with the second alias, at least one common characteristic between the first alias and the second alias. The computing system may also associate both the first alias and the second alias with the contact.

In certain embodiments, the computing system may monitor network traffic for communications sent to a child. The first communication may include a communication sent from the contact to the child. The computing system may also monitor network traffic for communications sent from the child. The first communication may include a communication sent from the child to the contact. In some embodiments, the computing system may monitor network traffic. Monitoring the network traffic may include identifying the first communication. Monitoring the network traffic may also include monitoring a plurality of network interface devices.

In at least one embodiment, the computing system may apply the communication-control policy by blocking the first communication. In certain embodiments, the computing system may record at least one communication in a communication session. The communication session may include the first communication. In some embodiments, the computing system may cause a graphical user interface to be displayed. The computing system may receive, through the graphical user interface, a request to associate the communication-control policy with the contact.

In various embodiments, the computing system may include a graphical user interface that may associate a communication-control policy with a contact. The computing system may also include a storage device in communication with the graphical user interface that may be configured to store the communication-control policy. The computing system may further include a monitoring module. The monitoring module may identify a first communication made via a first communication mechanism. The monitoring module may also identify a first alias associated with the first communication. The monitoring module may apply the communication-control policy to the first communication. The computing system may include a correlation module in communication with the storage device and the monitoring module that may determine that the alias is an alias of the contact.

In some embodiments, the monitoring module may identify a second communication made via a second communication mechanism. The monitoring module may identify a second alias associated with the second communication. The monitoring module may apply the communication-control policy to the second communication. The correlation module may determine that the second alias is an alias of the contact. In certain embodiments, the correlation module may identify contact data associated with the first alias. The correlation module may also identify contact data associated with the second alias. The correlation module may further identify, by comparing the contact data associated with the first alias with the contact data associated with the second alias, at least one common characteristic between the first alias and the second alias. The correlation module may associate both the first alias and the second alias with the contact.

In various embodiments, the monitoring module may monitor a plurality of network interface devices. In at least one embodiment, the monitoring module may block the first communication. In certain embodiments, the monitoring module may record the first communication in a communication report. The graphical user interface may display the communication report.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed. One or more of the steps disclosed herein may transform data and/or may transform a physical object (e.g., one or more of the steps disclosed herein may transform a configuration of a storage device by manipulating data on the storage device).

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method for controlling communications, at least a portion of the method being performed by a computing device comprising at least one processor, the method comprising:
   associating a communication-control policy with a contact rather than associating the communication-control policy with specific aliases of the contact such that the communication-control policy is applied to communications with the contact regardless of a communication mechanism used for the communications;
   identifying a first communication attempted by a child via a first communication mechanism;
   identifying, within the first communication, a first alias associated with a destination of the first communication;
   after identifying the first alias, determining that the first alias represents the contact;
   blocking the first communication as directed by the communication-control policy due to the association between the first communication and the contact;
   identifying a second communication attempted via a second communication mechanism that is different than the first communication mechanism, the second communication being attempted by the child as a result of the first communication being blocked;
   identifying, within the second communication, a second alias associated with a destination of the second communication;
   after identifying the second alias, determining that the second alias represents the contact;
   blocking the second communication as directed by the communication-control policy due to the association between the second communication and the contact.

2. The computer-implemented method of claim 1, wherein:
   the second alias is different than the first alias;
   the first and/or second aliases comprise at least one of a username and/or a messaging service handle.

3. The computer-implemented method of claim 2, further comprising:
   correlating the first alias with the second alias, wherein the correlating is performed by the communication-control policy.

4. The computer-implemented method of claim 3, wherein correlating the first alias with the second alias comprises:
   identifying contact data associated with the first alias;
   identifying contact data associated with the second alias;
   identifying, by comparing the contact data associated with the first alias with the contact data associated with the second alias, at least one common characteristic between the first alias and the second alias;
   in response to identifying the at least one common characteristic between the first alias and the second alias, associating both the first alias and the second alias with the contact.

5. The computer-implemented method of claim 4, wherein identifying the contact data associated with the first and second aliases comprises:
   accessing a first account of the child, the first account being an account used to access the first communication mechanism;
   obtaining, from the first account, the contact data associated with the first alias;
   accessing a second account of the child, the second account being used to access the second communication mechanism;
   obtaining, from the second account, the contact data associated with the second alias.

6. The computer-implemented method of claim 5, wherein obtaining the contact data associated with the first alias comprises extracting data from a display output of the first communication mechanism.

7. The computer-implemented method of claim 4, wherein associating both the first alias and the second alias with the contact comprises modifying a contact record for the contact by adding at least one of the first and/or second aliases to the contact record;
   the contact record comprises a name of the contact.

8. The computer-implemented method of claim 4, wherein:
   identifying the at least one common characteristic between the first alias and the second alias comprises determining that an email address associated with the first alias matches an email address associated with the second alias.

9. The computer-implemented method of claim 1, further comprising:
   causing a graphical user interface to be displayed;
   receiving, through the graphical user interface, a request to associate the communication-control policy with the contact, wherein associating the communication-control policy with the contact comprises associating the communication-control policy with a contact record that includes the first and second aliases of the contact and other information identifying the contact.

10. A system comprising:
   a graphical user interface programmed to associate a communication-control policy with a contact rather than associating the communication-control policy with specific aliases of the contact such that the communication-control policy is applied to communications with the contact regardless of a communication mechanism used for the communications;
   a storage device in communication with the graphical user interface and configured to store the communication-control policy;
   a monitoring module programmed to:
      apply the communication-control policy that directs a computing device to block the communications with the contact;
      identify a first communication attempted by a child via a first communication mechanism;
      identify, within the first communication, a first alias associated with a destination of the first communication;
      block the first communication as directed by the communication-control policy due to the association between the first communication and the contact;

identify a second communication attempted by the child via a second communication mechanism that is different than the first communication mechanism, the second communication being attempted as a result of the first communication being blocked;

identify, within the second communication, a second alias associated with a destination of the second communication;

block the second communication as directed by the communication-control policy due to the association between the second communication and the contact;

a correlation module in communication with the storage device and the monitoring module and programmed to:

determine that the first alias represents the contact after the first alias is identified within the first communication;

determine that the second alias represents the contact after the second alias is identified within the second communication;

at least one processor configured to execute the graphical user interface, the monitoring module, and the correlation module.

11. The system of claim 10, wherein:

the second alias is different than the first alias;

determining that the first alias represents the contact comprises determining that the first alias is listed in a contact record of the contact;

determining that the second alias represents the contact comprises determining that the second alias is listed in the contact record of the contact.

12. The system of claim 11, wherein the correlation module is programmed to:

identify contact data associated with the first alias;

identify contact data associated with the second alias;

identify, by comparing the contact data associated with the first alias with the contact data associated with the second alias, at least one common characteristic between the first alias and the second alias;

associate both the first alias and the second alias with the contact.

13. The system of claim 10, wherein the correlation module is programmed to identify contact data associated with the first and second aliases by:

retrieving login information for a first account of the child, the first account being an account used to access the first communication mechanism;

using the login information for the first account to access the first account;

obtaining, from the first account, the contact data associated with the first alias;

retrieving login information for a second account of the child, the second account being used to access the second communication mechanism;

using the login information for the second account to access the second account;

obtaining, from the second account, the contact data associated with the second alias.

14. The system of claim 10, further comprising identifying at least one common characteristic between the first alias and the second alias.

15. The system of claim 10, wherein:

the monitoring module is programmed to record the first communication in a communication report;

the graphical user interface is programmed to display the communication report.

16. A non-transitory computer-readable-storage medium comprising one or more computer-executable instructions that, when executed by a computing device, cause the computing device to:

apply a communication-control policy that directs the computing device to block communications with a contact rather than applying the communication-control policy with specific aliases of the contact such that the communication-control policy is applied to communications with the contact regardless of a communication mechanism used for the communications;

identify a first communication attempted by a child via a first communication mechanism;

identify, within the first communication, a first alias associated with a destination of the first communication;

after identifying the first alias within the first communication, determine that the first alias represents the contact;

block the first communication as directed by the communication-control policy due to the association between the first communication and the contact;

identify a second communication attempted by the child via a second communication mechanism that is different than the first communication mechanism, the second communication being attempted as a result of the first communication being blocked;

identify, within the second communication, a second alias associated with a destination of the second communication;

after identifying the second alias within the second communication, determine that the second alias represents the contact;

block the second communication as directed by the communication-control policy due to the association between the second communication and the contact.

17. The non-transitory computer-readable-storage medium of claim 16, wherein the second alias is different than the first alias.

18. The non-transitory computer-readable-storage medium of claim 17, wherein the one or more computer-executable instructions are programmed to cause the computing device to:

identify contact data associated with the first alias;

identify contact data associated with the second alias;

identify, by comparing the contact data associated with the first alias with the contact data associated with the second alias, at least one common characteristic between the first alias and the second alias;

associate both the first alias and the second alias with the contact.

19. The non-transitory computer-readable-storage medium of claim 16, further comprising:

providing a monitoring plug-in that monitors communications attempted via the first communication mechanism;

providing another monitoring plug-in that monitors communications attempted via the second communication mechanism.

20. The non-transitory computer-readable-storage medium of claim 16, wherein the one or more computer-executable instructions are programmed to record at least one communication in a communication session, the communication session comprising the first communication.

* * * * *